(12) United States Patent
Wang et al.

(10) Patent No.: US 7,331,239 B1
(45) Date of Patent: Feb. 19, 2008

(54) SELF CALIBRATING DUAL DIAPHRAGM PRESSURE SENSOR

(75) Inventors: Tzu-Yu Wang, Maple Grove, MN (US); Eugen I Cabuz, Edina, MN (US); Mihai Gologanu, Bucharest (RO)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/527,336

(22) Filed: Sep. 26, 2006

(51) Int. Cl.
*G01L 9/12* (2006.01)
(52) U.S. Cl. .......................... 73/718; 73/724
(58) Field of Classification Search ............... 73/718, 73/724
See application file for complete search history.

Primary Examiner—Andre J. Allen
(74) Attorney, Agent, or Firm—Kris T. Fredrick

(57) ABSTRACT

A pressure sensor having a predetermined chamber dome angle with an electrode. A hole is located in the top to provide pressure readings and the bottom has an input port. A primary diaphragm is coated on both sides with an electrode and an insulator. A secondary diaphragm is coated on the side which faces the primary diaphragm. Offset holes are made in the two diaphragms which permits pressure equalization during self calibration. Both diaphragms are initially energized to seal the gage volume, and then the secondary diaphragm is used to self calibrate using a known pressure.

20 Claims, 3 Drawing Sheets

SELF CALIBRATING DUAL DIAPHRAGM PRESSURE SENSOR

FIELD OF THE INVENTION

The present invention relates in general to pressure sensor and pump technology and, more particularly, to low cost pressure sensors for applications of pressure sensors for gases and liquids.

BACKGROUND OF THE INVENTION

Modern industrial, commercial, aerospace and military systems depend critically on reliable pressure sensors and pumps for fluid handling. Both gas and liquid fluids take advantage of smaller, more distributed and more portable systems for increasing uses in instrumentation and control.

Although important advances in pressure sensor and pump technologies have been made in the past few decades, progress has been slowed down considerably in the ability to reduce cost. Presently, such devices are manufactured and require a re-working step, where the pressure sensor is trimmed to tune it to the proper range for each pressure sensor.

It would be of great advantage if a pressure sensor could be developed that would utilize conventional mesopump construction at lower manufacturing costs.

Another advantage would be if mesopump technology could be modified to provide accurate pressure sensing devices for both liquid and gas that are self calibrating.

Yet another advantage would be if a pressure sensor using mesopump technology could be developed that could self calibrate before each use, thus assuring a more accurate use of the technology.

Other advantages and features will appear hereinafter.

SUMMARY OF THE INVENTION

The present invention provides a low cost, effective pressure sensor that is capable self calibrating at the time of manufacture and at other times as desired.

In its simplest form the invention comprises a stack of components or elements that form the pressure sensor. A sealed chamber part is of standard design and made from plastic or other materials. Openings are made or molded into the part to permit electrical contact with other elements of the device and to provide an input pressure port and a gage pressure port.

Manufacture of the pump is basically simple. A top chamber part is injection molded or otherwise formed with a predetermined chamber dome angle, and this dome is coated with a thin film metal electrode. A vent hole is located in the center of the top chamber to provide gage pressure readings. A bottom chamber is also formed to mate with the top chamber part and form a sealed chamber. Two diaphragms are held in the chamber for actuation, and electrical contact is provided as is done in conventional devices of this type.

A primary diaphragm is formed of an extruded polymer film or other diaphragm material and is coated on both sides with a thin film metal electrode and is further coated on both sides with a thin film dielectric insulator. Vent holes are made in the diaphragm, preferably off center, which as described below, permits pressure equalization during self calibration.

A secondary diaphragm is also formed of the same diaphragm material and coated on one side, which is to face the primary diaphragm. This same side is also coated with a thin film dielectric insulator. At least one vent hole is made, also for the purpose of self calibration.

The pressure sensor is self calibrating. Both diaphragms are initially energized to seal the gage volume, and then the lower or secondary diaphragm is used to calibrate using a known pressure. Use of the secondary diaphragm causes the applied pressure to convert, via a transfer function as is known in the art, the electro-static pressure into an equivalent pneumatic pressure.

BRIEF DESCRIPTION OF THE DRAWINGS

For a more complete understanding of the invention, reference is hereby made to the drawings, in which.

In the figures, like reference characters designate identical or corresponding components and units throughout the several views.

DETAILED DESCRIPTION OF THE PREFERRED EMBODIMENT

Figure 1:
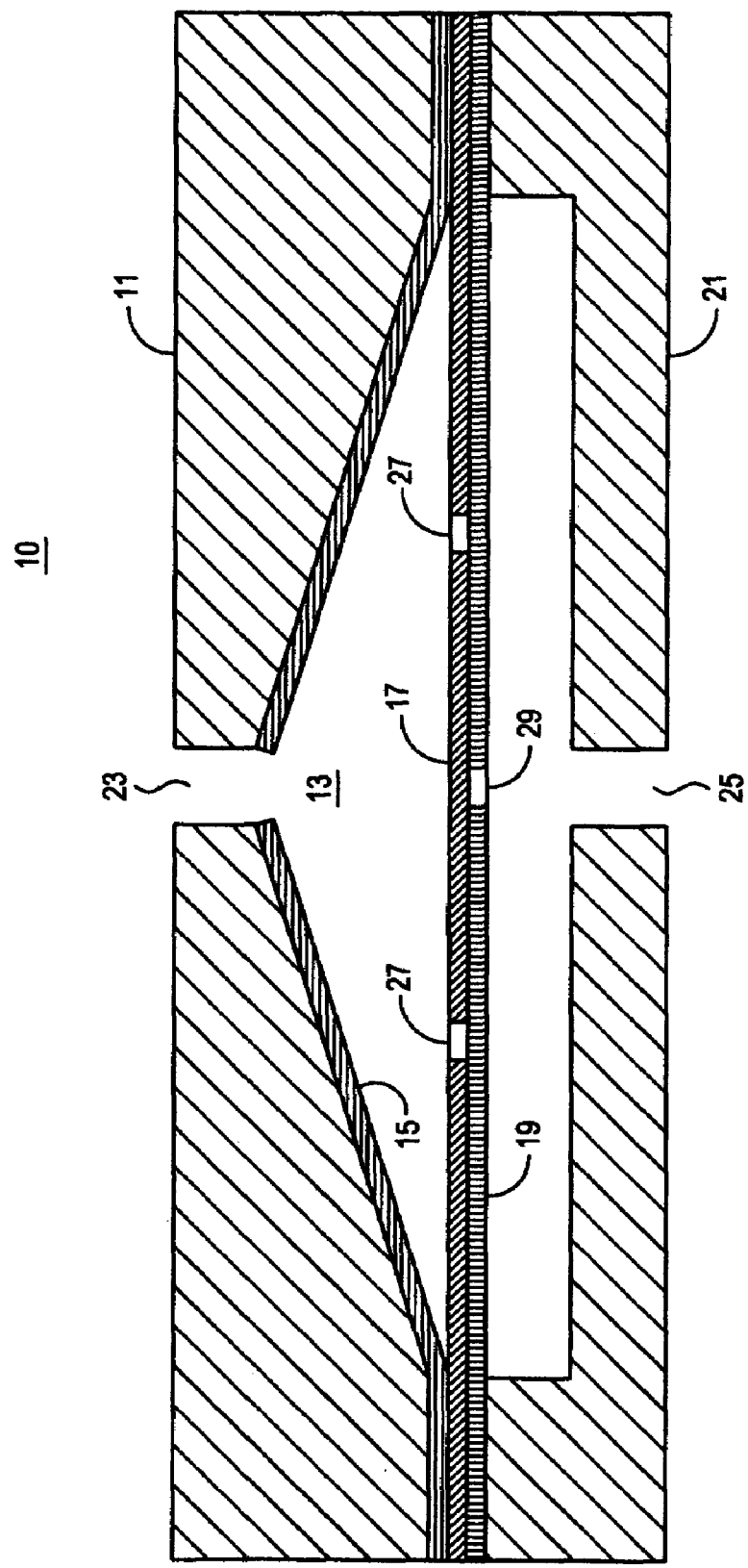
FIG. 1 is a side elevational view, in section, of one embodiment of the present invention.

Referring to the figures, the device 10 generally includes an upper sealed chamber defining part 11 with chamber 13, with the inner surface 15 coated with an electrode. A first flexible primary diaphragm 17 closes to upper chamber part 11 has two sides, both of which are coated with a thin film electrode and are further coated with a thin film dielectric insulator. A secondary flexible diaphragm 19 is positioned and having two sides is mounted on one side in communication with spacer 17. Secondary flexible diaphragm 19 also has a conductive surface on the side facing the primary diaphragm and an uncoated side facing the bottom chamber defining part 21.

Upper part 11 has a gas pressure port 23 and lower part 21 has an input pressure port 25. Primary diaphragm 17 has holes 27 that permit flow of fluid when not closed off by inner surface 15 of upper part 11 or by the surface of secondary diaphragm 19. This secondary diaphragm has holes 29 that are offset from holes 27, such that both holes 27 and 29 are sealed when primary diaphragm 17 and secondary diaphragm 19 are in mutual surface contact with each other.

The process of manufacturing this device is simple and straightforward, and avoids the need for calibration or trimming, substantially reducing the cost of manufacture.

Figure 2:
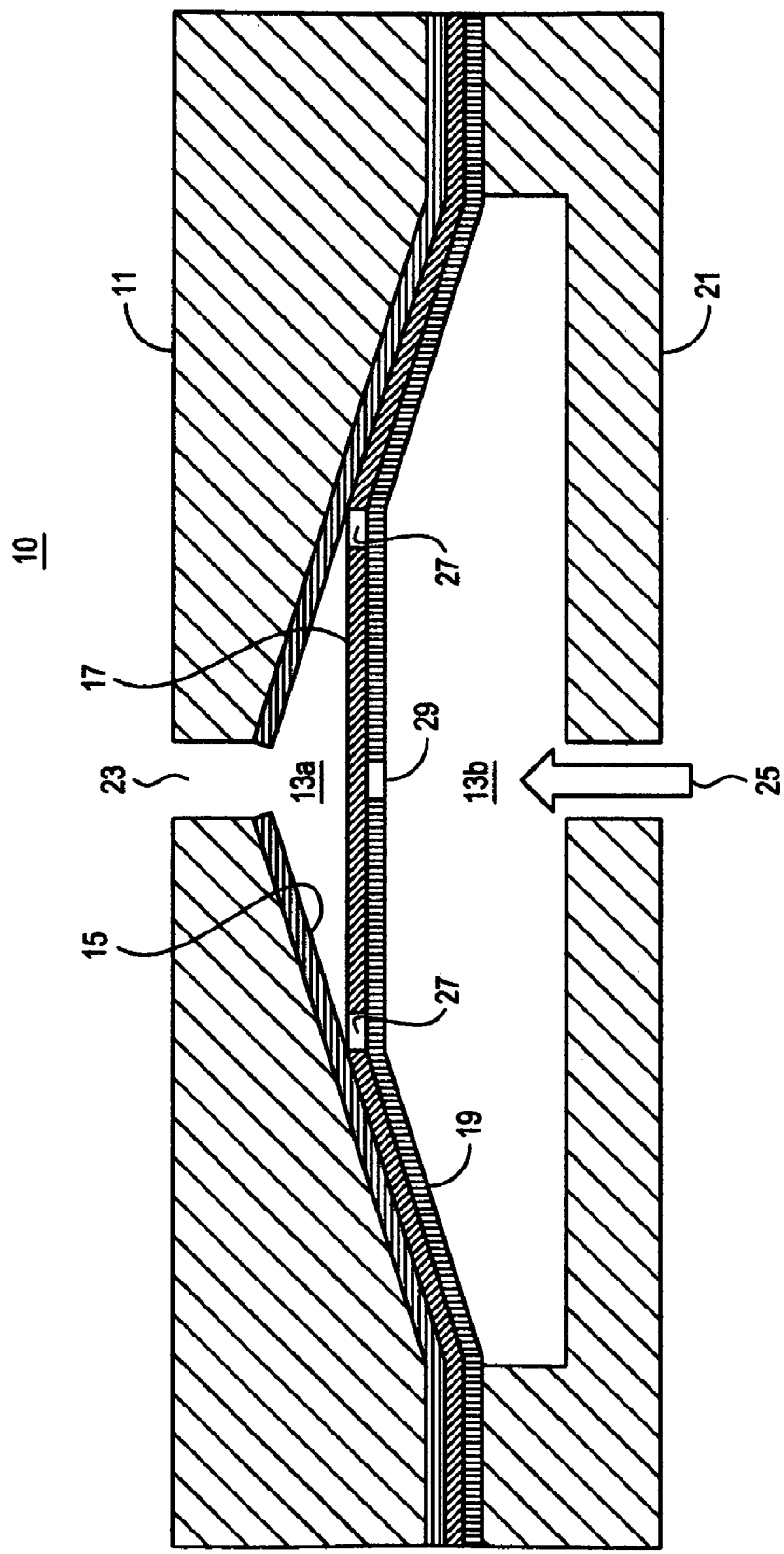
FIG. 2 is a side elevational view, in section, of the embodiment shown in FIG. 1, operating as a pressure sensor.

The preferred embodiment of this invention is shown in FIG. 1, before use. It is to be noted that the holes 27 in primary diaphragm 17 and holes 29 in secondary diaphragm 19 are closed because they are offset from each other. In FIG. 2, an input pressure enters the device through inlet 25 by energizing secondary diaphragm 19 binds the primary diaphragm 17 and secondary diaphragm 19 together to move in response to that pressure and exert a capacitive response between chamber 13 and primary diaphragm 17, such that a gage pressure at age pressure port 23 is measured. Expansion of chamber 13b causes compression of chamber 13a, in response to the applied pressure.

Figure 3:
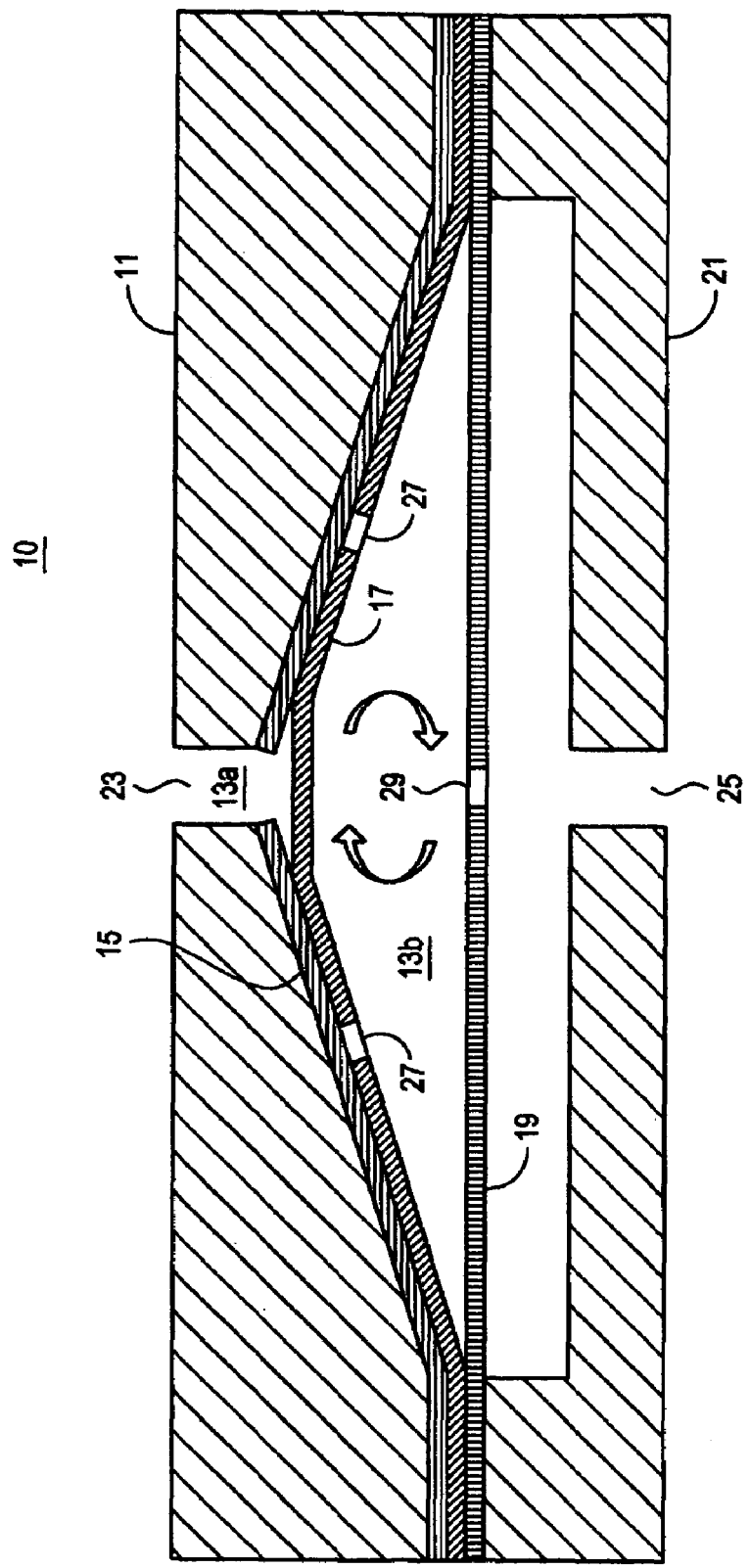
FIG. 3 is a side elevational view, in section, of the embodiment shown in FIG. 1, operating as a self calibration mode.

In FIG. 3, the important feature of the present invention of being capable of self calibration is shown. Both primary diaphragm 17 and secondary diaphragm 19 are energized, causing primary diaphragm 17 to seal the gage volume and allow the secondary diaphragm 19 to deflect in response to a known pressure in chamber 13b through holes 29 and input pressure through port 25. This self calibration can be done before and/or after each use of the device as a pressure sensor, to improve accuracy and reliability of the pressure sensor.

The pressure to be sensed may be from any fluid, including gases such as the atmosphere, gas pumps, chemical and electrolytic reactions, and the like or including liquids such as reactors, test devices, pumps and the like.

While particular embodiments of the present invention have been illustrated and described, they are merely exemplary and a person skilled in the art may make variations and modifications to the embodiments described herein without departing from the spirit and scope of the present invention. All such equivalent variations and modifications are intended to be included within the scope of this invention, and it is not intended to limit the invention, except as defined by the following claims.

The invention claimed is:

1. A device for sensing pressure, comprising:
a sealed chamber defining part having an upper portion and a lower portion and a gage pressure port in said upper portion and a input pressure port in said lower portion;
a primary flexible diaphragm having two sides and mounted in communication with the upper portion in said sealed chamber defining part, said primary flexible diaphragm having a conductive surface on both sides;
a secondary flexible diaphragm having two sides and mounted in contact with said primary flexible diaphragm, said secondary flexible diaphragm having a conductive surface on the side facing said primary flexible diaphragm;
said primary and secondary flexible diaphragms defining said upper portion and said lower portion respectively and each having at least one hole in their respective surfaces, said holes being offset from one another such that each diaphragm seals the holes in the other diaphragm surface; and
electrical connections contacting said primary and said secondary flexible diaphragms and selectively adapted to energize either or both of said diaphragms;
whereby energizing said secondary diaphragm binds said diaphragms together such that applied pressure deflects the bound diaphragms and provides a capacitive response between said upper part of said sealed chamber and said primary diaphragm in proportion to the pressure being measured.

2. The device of claim 1, wherein said at least one holes are sufficient in size to reduce impedance upon movement of fluid through said holes.

3. The device of claim 1, wherein said primary and secondary diaphragms each have a plurality of holes in their respective surfaces, said holes being offset from one another such that each diaphragm seals the holes in the other diaphragm surface.

4. The device of claim 3, wherein said plurality of holes are sufficient in size to reduce impedance upon movement of fluid through said holes.

5. The device of claim 1, wherein energizing both diaphragms seals said gage port and said secondary diaphragm responds to a calibration pressure to self calibrate said device.

6. The device of claim 1, wherein said electrical connections contacting said primary and said secondary flexible diaphragms are adapted to energize said secondary diaphragm binds said diaphragms together such that applied pressure deflects the bound diaphragms and provides a capacitive response between said upper part of said sealed chamber and said primary diaphragm in proportion to the pressure being measured after energizing both diaphragms seals said gage port and said secondary diaphragm responds to a calibration pressure to self calibrate said device.

7. A device for sensing pressure, comprising:
sealed chamber defining part means for having an upper portion and a lower portion and a gage pressure port in said upper portion and a input pressure port in said lower portion;
primary flexible diaphragm means for movement upon electrical energization and having two sides and mounted in communication with the upper portion in said sealed chamber defining part, said primary flexible diaphragm having a conductive surface on both sides;
secondary flexible diaphragm means for movement upon electrical energization and having two sides and mounted in contact with said primary flexible diaphragm means, said secondary flexible diaphragm means having a conductive surface on the side facing said primary flexible diaphragm means;
said primary and secondary flexible diaphragms means defining said upper portion and said lower portion respectively and each having at least one hole in their respective surfaces, said holes being offset from one another such that each diaphragm seals the holes in the other diaphragm surface; and
electrical connections means for contacting said primary and said secondary flexible diaphragms and selectively energize either or both of said diaphragm means;
whereby energizing said secondary diaphragm means binds said diaphragm means together such that applied pressure deflects the bound diaphragm means and provides a capacitive response between said upper part of said sealed chamber means and said primary diaphragm means in proportion to the pressure being measured.

8. The device of claim 7, wherein said at least one holes are sufficient in size to reduce impedance upon movement of fluid through said holes.

9. The device of claim 7, wherein said primary and secondary diaphragms each have a plurality of holes in their respective surfaces, said holes being offset from one another such that each diaphragm seals the holes in the other diaphragm surface.

10. The device of claim 9, wherein said plurality of holes are sufficient in size to reduce impedance upon movement of fluid through said holes.

11. The device of claim 7, wherein energizing both diaphragms seals said gage port and said secondary diaphragm responds to a calibration pressure to self calibrate said device.

12. The device of claim 11, wherein said electrical connection means contacting said primary and said secondary flexible diaphragm means are adapted to energize said secondary diaphragm binds said diaphragms together such that applied pressure deflects the bound diaphragms and provides a capacitive response between said upper part of said sealed chamber and said primary diaphragm in proportion to the pressure being measured after energizing both diaphragms seals said gage port and said secondary diaphragm responds to a calibration pressure to self calibrate said device.

13. A method of sensing pressure, comprising:
providing a sealed chamber defining part having an upper portion and a lower portion and a gage pressure port in said upper portion and a input pressure port in said lower portion;
inserting a primary flexible diaphragm having two sides and mounted in communication with the upper portion in said sealed chamber defining part, said primary flexible diaphragm having a conductive surface on both sides;
inserting a secondary flexible diaphragm having two sides and mounted in contact with said primary flexible diaphragm, said secondary flexible diaphragm having a conductive surface on the side facing said primary flexible diaphragm;
positioning said primary and secondary flexible diaphragms to define said upper portion and said lower portion respectively and forming at least one hole in their respective surfaces, said holes being offset from one another such that each diaphragm seals the holes in the other diaphragm surface; and
electrically energizing said secondary diaphragm binds said diaphragms together such that applied pressure deflects the bound diaphragms and provides a capacitive response between said upper part of said sealed chamber and said primary diaphragm in proportion to the pressure being measured.

14. The method of claim 13, which in which said at least one holes are sufficient in size to reduce impedance upon moving fluid through said holes.

15. The method of claim 13, wherein a plurality of holes are provided on said diaphragm surfaces, said plurality of holes on each of said diaphragms being offset from the holes on the other of said diaphragms.

16. The method of claim 15, which in which said plurality of holes are sufficient in size to reduce impedance upon moving fluid through said holes.

17. The device of claim 13, which further includes the step of energizing both diaphragms seals said gage port and said secondary diaphragm responds to a calibration pressure to self calibrate said device.

18. The method of claim 17, which further includes the step of performing said self calibration step prior to each pressure sensing step.

19. The method of claim 13, wherein said electrical connection means first energizes both diaphragms seals said gage port and said secondary diaphragm responds to a calibration pressure to self calibrate said device, and then contacts said primary and said secondary flexible diaphragm means to energize said secondary diaphragm binds said diaphragms together such that applied pressure deflects the bound diaphragms and provides a capacitive response between said upper part of said sealed chamber and said primary diaphragm in proportion to the pressure being measured.

20. The method of claim 19, wherein said self calibration step is performed prior to each pressure sensing step.

* * * * *